United States Patent Office 3,062,759
Patented Nov. 6, 1962

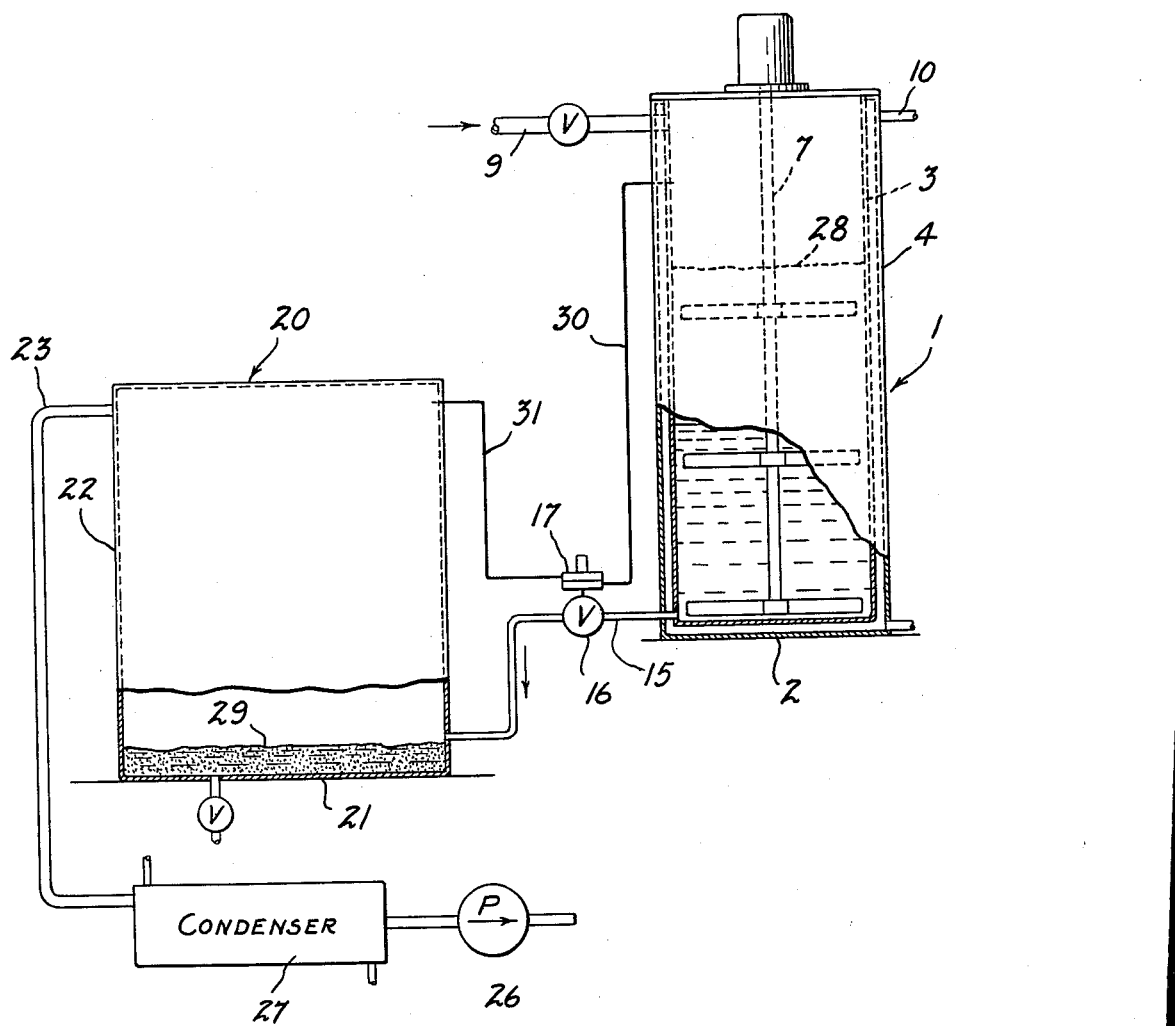

3,062,759
PROCESS OF PRODUCING BLOTTER-TYPE VINYL HALIDE RESIN AND PRODUCT OBTAINED THEREBY
Robert E. Bingham, Cuyahoga Falls, and Harry D. Forrest, William J. Hanlon, and James L. Hutson, Ashtabula, Ohio, assignors to The General Tire & Rubber Company, Akron, Ohio, a corporation of Ohio
Filed June 23, 1959, Ser. No. 822,371
9 Claims. (Cl. 260—2.5)

The present invention relates to a method of preparing blotter-type polyvinyl halide resins which have a high capacity for absorbing plasticizer and holding the plasticizer so well that the plasticizers cannot be removed even by centrifuging and to the resins per se.

The blotter type resins have enjoyed much commercial success and are generally used to make dry blends or mixes of polyvinyl halide compositions which can be used for calendering or extruding. In the dry blends, the resin particles are in contacts so the mix remains a powder. This is in contrast to the liquid plastisols which have a continuous liquid phase. These blotter resins are, as hereinafter more fully described, produced by an explosion or blowing process analogous to that used for making puffed wheat but wherein the blowing agent is vinyl monomer instead of steam. The blowing is accomplished by suddenly reducing pressure on the polyvinylchlorode/monomer/water suspension system when conversion of monomer to polymer is relatively low. Because of the low conversion of monomer to resin and the fact that rate of conversion is faster at higher conversions, the blotter resin has been considered to be more costly to produce than regular grades. It is an object of the present invention to provide a vinyl resin with high plasticizer take-up properties.

It is another object to provide a convenient economical method of producing polyvinyl chloride resins of the blotter-type wherein the total capacity of the plant to produce resin is not reduced.

Other objects will be apparent from the following specification, claims and drawing in which:

The FIGURE is a fragmentary schematic view of polymerization equipment used to polymerize vinyl chloride in accordance with the present invention. In the figure, some parts are broken away and shown in section.

The quantity of monomer charged into autoclaves or reactors and the polymerization rate are dictated largely by the rate at which exothermic heat of polymerization can be removed. One aspect of the present invention is based on the discovery that the exothermic heat can be removed faster and the rate of exothermic heating is less at low conversions. The reactors can therefore be filled to a greater extent during low conversions without danger of excessive pressure by over heating.

According to the present invention, a typical suspension type polymerization charge for a calendering grade resin comprising vinyl chloride monomer, water, suspending agents such as polyvinyl alcohol, methyl cellulose, etc., a monomer soluble reaction catalyst such as lauroyl peroxide and a basic compound such as sodium hydroxide, sodium bicarbonate or sodium sulphite is charged into a reaction vessel adapted to withstand pressure. The contents of the vessel are vigorously stirred and the temperature maintained at abotu 100° F. to 150° F. as is well known in the art of polymerizing vinyl halides. The vessel may be substantially completely filled or filled to a point where the rate of heat transfer would not permit maintaining proper temperature at maximum rates of conversion. After the polymerization charge has been reacted to at least about 40 percent, and preferably 45 to 50 percent conversion, and before maximum rate of conversion is reached, a relatively small amount, preferably about 20 to 40 percent by weight of the reaction mixture, is transferred or thieved away from the main charge and rapidly removed through a restricted opening to a second chamber at greatly reduced pressure from the first reaction chamber. The restricted opening causes a sudden pressure drop to produce a spongy blotter type resin as the vinyl chloride monomer entrapped within the polymer particles flashes and expands in the second chamber to blow and puff up the polymer particles. Thus a polyvinylchloride resin having very high plasticizer take-up properties is easily and conveniently removed from the second chamber. The amount of material in the first chamber is reduced sufficiently to permit control of temperature at maximum rate of conversion. A normal calendering grade polyvinyl chloride resin is produced from the material remaining in the first chamber merely by continuing the reaction during and after the thieving of part of the charge to make a blotter type resin. The amount remaining in the reaction vessel to produce the normal polyvinylchloride may still be the maximum permissible amount for proper heat transfer at high conversion. One thereby obtains the blotter type resin as a bonus over rated plant capacity.

We have found that the pressure differential, i.e. the difference between the pressure on the two sides of the restricted opening, forms an important element of our process along with timing the flashing operation so that it takes place when the main reactor charge is between 40 and 55 percent by weight converted from monomer to polymer. For best results, as exhibited by a high plasticizer take-up property and a relatively low bulk density in the resultant blotter type resin, the sudden pressure drop between the reaction vessel and the second vessel or dump tank should be between 70 and 90 pounds per square inch although satisfactory resins having an irreversible plasticizer take-up value of at least about 55 to 60 and a bulk density of at least about .2 to .25 g./cc. can be prepared using differential degassing pressures as high as 120 p.s.i. and as low as 35 to 40 pounds per square inch.

When pressure differentials higher than about 120 to 130 p.s.i. are used in blowing the resin particles, the bulk density becomes much less than when using pressure differentials of 70 to 90 p.s.i. and the resin particles become too light for economical bagging, storing, and shipping.

The invention claimed herein relates to blotter type resins and to a method of making such resins which employs a rapid or sudden reduction in pressure of the type obtained when passing through an orifice or restricted opening from a large chamber having a high internal pressure to a second large chamber having a much lower internal pressure.

If the thieving process is used to obtain the product of the present invention, an advantage in capacity is obtained whenever small amounts such as 2 or 3% or so of the charge are removed from the first reactor to reduce it to its maximum normal charge.

The amount of original monomer charged which is thieved away may be as high as 50% if desired for economical manufacture of both the regular calendering resins and the blotter type resins. However, for easier handling of the processing materials and for more accurate control of critical limits on the overall process, about 20 to 40 percent by weight of the original charge is preferably thieved away.

The term irreversible plasticizer take-up (hereinafter sometimes abbreviated as IPTU) refers to the amount of plasticizer that fills the pores and crevices within particles which can be considered a measure of the interparticle free space. This amount of plasticizer should be distinguished from plasticizer that fills the voids between particles or the inter-particle space, and which can be described as reversible plasticizer take-up. This reversible plasticizer take-up component can be removed by centrifugation whereas the irreversible plasticizer take-up component cannot be removed even by centrifuging at speeds in the order of 1300 r.p.m.

The procedure used to determine the irreversible plasticizer content of the blotter type resin produced according to the present invention is described below:

A sample of resin is placed in a centrifuge tube to which an excess of plasticizer is added and partially mixed with the resin. The mixture is centrifuged to remove the excess or unabsorbed plasticizer. The parts plasticizer absorbed per hundred parts resin is termed IPTU or irreversible plasticizer take-up.

In this test a glass tube 85 mm. long and a diameter of 10 mm. may be used to hold a definite amount of the polyvinylchloride resin plasticizer mixture. The glass tube has a capillary attached to its bottom portion with a 1.5 mm. bore. A small amount of glass wool is placed loosely in the bottom of the tube to fill the cone shaped part to prevent loss of the resin. The tube is weighed to obtain a tare weight containing the glass wool. An amount of polyvinylchloride resin is weighed out for testing. The amount of resin used is based on the bulk density as follows: 20 times bulky density=approximate number of grams of polyvinylchloride to charge into the tared glass tube. Each sample tested in a set should have the same weight of polyvinylchloride resin based on the resin with the lowest bulk density.

A 20 ml. portion of dioctyl phthalate is added to the tube in two 10 ml. portions. The plasticizer is mixed with the resin using a spatula after the first dioctyl phthalate addition, but care must be taken so as not to disturb the glass wool. The resin is rinsed off of the spatula with the second 10 ml. portion.

The glass tube filled with resin and plasticizer is then placed in a metal shield in which a cork ring has been inserted to prepare the sample for centrifuging. The cork ring cushions the tube as well as provides a space for the excess dioctyl phthalate. The samples should be placed opposite each other in the centrifuge to prevent unbalancing. The samples in the glass tube are then spun in a centrifuge which is operated at 1300 r.p.m. based on a tachometer reading.

After 5 minutes, the centrifuge is stopped, the tubes removed from the shields, and excess dioctyl phthalate emptied from the shields. Then the shields and tubes are replaced and the tubes spun for 10 minutes after which they are emptied again. The testing is continued for three 15 minute periods and two 30 minute periods, the excess dioctyl phthalate being emptied after each centrifuging period. The tube and contents are then weighed. Running of the centrifuge is continued for 5 minute intervals and the tubes are weighed between each run, until the loss in weight is 0.10 gram or less for 5 minutes of centrifuging.

The difference between the final weight of the tube and contents after centrifuging and the weight of the tube with glass wool and dry resin at start is equal to the weight of dioctyl phthalate retained. The difference in grams divided by the weight of resin times 100 gives the irreversible plasticizer take up value (IPTU).

While the bulk density is generally not as important a property of the blotter type resins as the irreversible plasticizer take-up, nevertheless for most applications the advantage in reduced storage space required is valuable so that a bulk density of at least .25 gram/cubic centimeter is preferred. However, blotter type resins having a bulk density as low as 0.2 gram/cc. or even 0.15 gram/cc. can sometimes be economically bagged, stored, shipped and adapted to processing operations such as extruding.

According to the present invention, after a minor portion of the main charge is removed for conversion to a blotter type resin, the balance of the main polymerization charge is continued to be reacted to a range of about 60 to 95 percent or more conversion as is well known in the art by using reaction temperatures of about 100° F. to 150° F. The polymerization is generally stopped in the 60 to 95% conversion range.

Another advantage is the fact that the reaction vessel can be filled with more reactants than previously used since generally about $\frac{1}{10}$ up to $\frac{1}{3}$ of the charge is removed to make a blotter type resin. Thus even after a portion of the original reaction charged is thieved away, a normal size main charge still remains for polymerization. In this manner, higher production of polyvinyl halide resins can be obtained with the same capacity reactor and other processing equipment. The rate of polymerization of the whole charge is not appreciably slowed down in the first phase of polymerization before the blotter type resin portion is removed since the heat transfer is much better at the beginning of the polymerization than at the end. Thus, although the heat transfer is poorer in the last portion of the reaction, not as much polymerization charge is present, part of the charge being removed for conversion into a blotter-type resin.

Referring to the drawing, a cylindrical reaction vessel 1 is shown having a bottom 2, vertical walls 3 and cooling water jacket 4. The reactor 1 is equipped with a stirrer 7 which is rotated by driving means not shown. The reactor has a charge line 9 and 10 and a main discharge line 15 having a differential pressure control valve 16. Discharge line 15 connects reaction vessel 1 with a second cylindrical vessel 20 which is a blow down tank. Tank 20 has a bottom 21, and side walls 22 and a vapor discharge line 23 through which the monomer vinyl chloride in vapor form is pulled by means of a pump 26 to a condenser 27 where the monomer is recovered as a liquid.

A charge 28, of heated water, vinyl chloride monomer at about room temperature, protective colloid, a polymerization catalyst etc. as is usual for suspension polymerization of vinyl chloride is brought into reactor 1 through feed lines 9 and 10 in which the monomer is kept under pressure during storage by pumping means not shown. The water is at a temperature sufficient to give the resulting charge a temperature of about 130° F. The charge is stirred under pressure until 30 to 50% of the monomer is converted to polymer. If it is desired to prepare only blotter type resin, the entire charge may be drawn off from the reaction vessel 1 by discharge line 15 into blow down tank 20 where the pressure is much less than in the reaction vessel 1. If both blotter type and conventional resin are to be prepared, the amount of suspension removed to the tank 20 may be only sufficient to reduce the amount in the reactor to a point where heat transfer will permit good control of temperatures at maximum rate of conversion. The monomer liquid caught in polymer particles flashes off in the second vessel and greatly puffs up the resin particles. A small amount, about 0.01 to 0.05 part or more, of a shortstop or suitable inhibitor of vinyl chloride polymerization may be incorporated in the charge just prior to thieving. An example of such shortstop or inhibitor is an organic hydroperoxide such as tertiary butyl hydroperoxide, diisopropyl benzene mono-hydroperoxide and the like. The addition of a shortstop at this point permits the charge (say up to 55% conversion) to be held in the tank until the operator is ready at his convenience to discharge the entire reaction mixture to another vessel at lower pressure to blow the polymer. As previously indicated the valuable monomer is recovered by means comprising pump 26 and condenser 27, and may later be separated from the shortstop by distillation for further use.

The reaction mixture in the reaction chamber can be thieved at 40–55% conversion and more monomer, water and the like added and reaction continued until about a 50% conversion is again obtained when the reaction mixture can again be thieved. Thus, a blotter-type resin can be continuously or semi-continuously produced. On the other hand, as pointed out above, the mixture remaining in the reactor can be polymerized to substantially complete conversion and shortstopped to provide a calender grade resin.

The pressure differential control valve 16 having a spring loaded diaphragm controller 17 allows part of the main reactor charge to be removed from reaction vessel 1 providing the pressure differential between reactor 1 and blow down tank 20 is above a certain minimum value which is necessary to produce a good blotter type as previously pointed out. The valve may be a controlled spring loaded diaphragm type of controller in which a piston inside the valve is pushed to open or close the passageway of aqueous charge through discharge line 15. Pressure from a line 30 from reactor 1 is exerted on a diaphragm from one side. This pressure is partially counter balanced by a spring plus pressure from a line 31 connected to tank 20. When the pressure differential of reactor 1 and tank 20 falls to a certain low value the piston is forced to a position where the flow of thieved charge is stopped. In this manner, a certain determined pressure differential is always maintained to insure a good quality blotter type resin.

The following examples illustrate the present invention:

EXAMPLE I

A blotter type polyvinylchloride resin and a normal calendering type resin was prepared starting with the following formula for a common initial reaction charge:

Ingredients: Parts by weight
- Vinyl chloride monomer _____ 100
- Water _____ 200
- Protective colloid (methyl cellulose or polyvinyl alcohol) _____ 0.1
- Sodium bicarbonate _____ 0.025
- Catalyst: lauroyl peroxide _____ 0.1

The above ingredients were charged under pressure into a main high pressure reactor equipped with a mechanical stirrer and polymerization started using a temperature of 130° F.

After the monomer charge reached the point of 45% conversion to polymer, 30% of the charge was drawn off through the valve 16 in a 1″ stainless steel line into a dump tank. The valve is opened just sufficiently to permit the pressure to be maintained 80 p.s.i. lower than that in the reactor. The balance of the charge (70%) was polymerized to 90% conversion when it was shortstopped to obtain a calender grade polyvinyl chloride resin.

A blotter type resin was obtained from the slurry thieved away from the main charge.

The resulting blotter type resin has the following properties:

- Intrinsic viscosity _____ 1.00
- Bulk density _____ .31
- Irreversible PTU _____ 91
- Moisture _____ .1
- Mill stability _____ Good
- Clarity _____ Acceptable
- Fish-eyes/ft.$^2$ _____ 32

Sieve:
- Retained on 60 mesh____percent by weight__ None
- Retained on 80 mesh_____do____ 1
- Retained on 100 mesh_____do____ 9
- Retained on 140 mesh_____do____ 35
- Retained on 170 mesh_____do____ 32
- Retained on 200 mesh_____do____ 5
- Retained on less than 200 mesh_____do____ 18

The mill stability of the puffed-wheat type of resin was good and excellent extruded flexible refrigerator gaskets were produced from dry blend compositions using the blotter type resin.

As noted in the above table, a polyvinylchloride composition can be measured for colloidability or homogeneity. Homogeneity is measured by visually counting the number of "fish-eyes" (unplasticized particles of polyvinylchloride) present in a given area of a polyvinylchloride sheet. The sheet is generally prepared by molding into the sheets a composition of 100 parts PVC resin, 50 parts dioctyl phthalate and 2 parts of a stabilizer such as glycerol mono-oleate. The sheets having the greatest number of fish-eyes have the poorest homogeneity.

EXAMPLE II

A series of blotter type resins were prepared by removing forty percent of a normal polymerization charge of vinyl chloride having the formula shown in Example I at 36.4 and 40.1 percent conversion. The flashing pressure differential was varied from 117 p.s.i. gauge to 37 p.s.i. gauge to produce various blotter type resins. The resins were tested to determine the bulk density and irreversible plasticizer take-up properties, the results of which are shown in Table I.

TABLE I
Effect of Δ p.s.i. (Differential Pressure) on Blotter Properties

| Pressure in Blow-down | A | | | B | | | C | | | D | | |
|---|---|---|---|---|---|---|---|---|---|---|---|---|
| | Δ p.s.i. | B.D. | IPTU | Δ p.s.i. | B.D. | IPTU | Δ p.s.i. | B.D. | IPTU | Δ p.s.i. | B.D. | IPTU |
| 0 | 117 | .20 | 149 | 117 | .21 | 136 | 117 | .12 | 161 | 117 | .20 | 144 |
| 10 | 107 | .27 | 112 | 107 | .25 | 117 | 107 | .14 | 154 | 107 | .23 | 127 |
| 20 | 97 | | | 97 | | | 97 | | | 97 | .22 | 128 |
| 30 | 87 | | | 87 | | | 87 | | | 87 | .30 | 100 |
| 40 | 77 | .37 | 90 | 77 | .32 | 79 | 77 | .21 | 111 | 77 | .34 | 66 |
| 50 | 67 | | | 67 | | | 67 | | | 67 | .36 | 73 |
| 60 | 57 | .38 | 58 | 57 | .33 | 77 | 57 | .24 | 102 | 57 | .38 | 53 |
| 80 | 37 | .38 | 56 | 37 | .34 | 73 | 37 | | | 37 | | |
| | Percent Conversion=36.4 r.p.m. 123 Colloid .10 | | | Percent Conversion=36.4 r.p.m. 123 Colloid .10 | | | Percent Conversion=40.1 r.p.m. 123 Colloid .08 | | | Percent Conversion=40.1 r.p.m. 106 Colloid .10 | | |

In the above table, B.D.=bulk density, IPTU=irreversible plasticizer take up, and colloid indicates the percent by weight of colloidal material based on the monomer charge.

As seen in Table I, the blotter type resins produced at 117 p.s.i. gauge differential pressure had very high plasticizer take-up properties but very low bulk densities. It is also seen that, in most cases, a differential of at least 60 p.s.i. is required to produce a resin having an irreversible plasticizer take-up value of 60 although in the case of column B, the irreversible plasticizer take-up property was still as high as 73 even though the pressure differential was only 37 p.s.i.

The amount of agitation, as indicated by the r.p.m. reported in Table I, makes some difference in the amount of pressure differential required to produce the same plasticizer take-up or bulk density properties in the resin.

The amount of a water soluble colloid material such as methyl cellulose, gelatin or the like, used to separate the resin particles, is generally between 0.02 and 1 part based on 100 parts of the monomer.

EXAMPLE III

A series of blotter type polyvinylchloride resins were prepared using the formula given in Example I and removing about ⅓ the reactor charge to produce the blotter type resin. A pressure differential of 117 p.s.i. gauge was used and the percentage conversion varied from 6.4% to 44.0%.

Results of tests conducted on the resins are shown in Table II.

TABLE II
Effect of Conversion on Blotter Properties

| Reaction Hours | E | | | F | | |
|---|---|---|---|---|---|---|
| | Percent Conversion | Bulk Density | Irreversible PTU | Percent Conversion | Bulk Density | Irreversible PTU |
| 4 | 6.4 | .07 | 311 | 6.4 | | |
| 5 | 10.1 | | | 10.1 | .07 | 258 |
| 6 | 13.9 | | 301 | 13.9 | | |
| 7 | 17.6 | .08 | 265 | 17.6 | .08 | |
| 8 | 21.2 | | 255 | 21.2 | .09 | 222 |
| 9 | 25.0 | | | 25.0 | .12 | 152 |
| 10 | 28.9 | | 200 | 28.9 | | |
| 11 | 32.7 | | | 32.7 | .20 | 147 |
| 12 | 36.4 | .15 | 193 | 36.4 | | |
| 13 | 40.1 | | | 40.1 | .30 | 85 |
| 14 | 44.0 | .26 | 117 | 44.0 | | |
| | Δp.s.i.g.=117 | | | Δp.s.i.g.=117 | | |

As seen in Table II, the percent conversion should be generally about at least 30 percent to obtain a resin with a bulk density of at least .15 to .20. A 40 to 45 percent conversion is preferred to obtain a bulk density of at least 0.25 gram/cc.

The vinyl chloride monomer used in the above examples may be replaced in whole or part by other vinyl halid monomers such as vinyl bromide. Blotter type resins may also be produced in which the polymer is a copolymer of 80–95% by weight of vinyl chloride and 5–20% vinyl acetate or vinylidene chloride.

Other monomer-soluble polymerization catalysts, and particularly conventional free radical type catalysts, may be substituted for the lauroyl peroxide as is well known. Other catalysts including both water and monomer soluble catalysts such as benzoyl peroxide, alkali and ammonium perborates, alkali persulfates, hydrogen peroxide, alkali perbenzoates including sodium perbenzoate and potassium perbenzoate, activated, where necessary, by reducing agents soluble in the phase in which the oxidizing catalyst is least soluble may also be used as in the well known "Redox" systems. The amount of catalyst generally used is about 0.05 to 2 percent by weight based on the weight of the vinyl chloride monomer.

The term "suspension," used in the claims to define the polymerization system, excludes conventional emulsion polymerization processes.

It is well understood that, in accordance with the provisions of the patent statutes, variations and modifications of the specific invention may be made without changing the spirit thereof.

What we claim is:

1. A method of producing a blotter type resin of a vinyl halide in a suspension polymerization system comprising the steps of mixing water, a monomer comprising a vinyl halide, a polymerization catalyst and a protective colloid to form a mixture in a closed reaction zone, agitating said mixture at elevated temperature to maintain said monomer in aqueous suspension and to polymerize said monomer while maintaining a pressure in said zone, and suddenly reducing pressure about 35 to 130 pounds per square inch on about 2 to 50 percent by weight of the reaction mixture to volatilize the unpolymerized vinyl monomer, when the conversion of said monomer to polymer has reached about 40 to 55 percent of that possible, by passing it through an orifice to a second zone while maintaining a pressure therein of about 35 to 130 pounds per square inch lower than in said first reaction zone.

2. A method of producing a blotter type polyvinyl halide resin in a suspension polymerization system comprising the steps of mixing water, a monomer comprising a vinyl halide, a polymerization catalyst and protective colloid to form a mixture in a closed reaction chamber, agitating said mixture at elevated temperature to polymerize said monomer while maintaining a pressure in the reaction chamber, suddenly reducing the pressure from about 70 to 90 pounds per square inch on from about 2 to 50 percent by weight of the reaction mixture, when the conversion of the monomer to polymer has reached about 40 to 55 percent of that possible, by bleeding it through a restricted opening to a second chamber while maintaining a pressure therein of about 70 to 90 pounds per square inch lower than in the first reaction chamber to volatilize the unpolymerized vinyl monomer, separating the resultant blown polyvinyl halide composition from the water and monomer of the material bled to said second chamber, and continuing the polymerization of the monomer remaining in said reaction chamber until the conversion to polymer is about 60 to 95 percent.

3. A method defined in claim 2 where the vinyl halide monomer is vinylchloride.

4. In a suspension process of polymerizing a vinyl halide monomer comprising the steps of mixing water, said monomer, a polymerization catalyst and a protective colloid to form a mixture in a closed reaction vessel and agitating said mixture at elevated temperature to polymerize said vinyl monomer while maintaining a pressure in said vessel, the improvement which comprises the steps of providing a second vessel having a lower internal pressure and a restricted opening between said vessels, providing a pressure differential across said opening of about 35 to 130 pounds per square inch, and passing at least a part of the reaction mixture from said reaction vessel through said opening to said second vessel when the conversion of said monomer to polymer has reached about 40 to 55 percent to cause sudden reduction of pressure, to volatilze the unpolymerized vinyl monomer, and to expand the vinyl polymer, thereby rendering it porous.

5. A process as defined in claim 4 wherein the sudden drop in pressure on the reaction mixture as it passes from said reaction vessel to said second vessel is at least 70 pounds per square inch.

6. A process as defined in claim 4 wherein the polymerization is inhibited by adding a shortstop prior to passing of the reaction mixture from said reaction vessel to said second vessel.

7. A blotter-type resin of a polymerized monomer of a vinyl halide prepared according to the method of claim 6, said resin having an irreversible plasticizer take-up of at least 55.

8. A blotter-type polyvinyl chloride resin of high porosity having an irreversible plasticizer take-up of at least 55 and a bulk density of at least 0.2 gram per cubic centimeter, said resin being prepared in a suspension polymerization system by mixing water, vinyl chloride, a protective colloid and a polymerization catalyst, polymerizing said monomer, and, when the conversion of monomer to polymer is about 40 to 55 percent, suddenly reducing the pressure at least 35 pounds per square inch to volatilize the unpolymerized vinyl chloride monomer and to expand the vinyl polymer.

9. In a suspension process of polymerizing vinyl chloride comprising the steps of mixing water, the vinyl chloride monomer, a protective colloid, and a polymerization catalyst to form a mixture in a closed reaction vessel and agitating said mixture at elevated temperature to maintain said monomer in aqueous suspension and to polymerize said vinyl monomer while maintaining a pressure in said vessel, the improvement which comprises the steps of providing a second vessel having a lower internal pressure and a restricted opening between said vessels, providing a pressure differential across said opening of about 35 to 130 pounds per square inch, and passing at least a part of the reaction mixture from said reaction vessel through said opening to said second vessel when the conversion of said monomer to polymer has reached about 40 to 55 percent to cause sudden reduction of pressure, to volatilize the unpolymerized vinyl monomer, and to expand the resulting polyvinyl chloride, thereby rendering it porous.

References Cited in the file of this patent

UNITED STATES PATENTS

| | | |
|---|---|---|
| 2,674,593 | Condo et al. | Apr. 6, 1954 |
| 2,772,256 | Manganelli | Nov. 27, 1956 |

OTHER REFERENCES

Schildknecht, "Polymer Processes," Interscience Publishers, Inc., New York, N.Y. (1956), pages 85–86.